United States Patent
Nguyen et al.

(10) Patent No.: US 10,509,449 B2
(45) Date of Patent: Dec. 17, 2019

(54) PROCESSOR POWER ADJUSTMENT

(71) Applicant: HEWLETT PACKARD ENTERPRISE DEVELOPMENT LP, Houston, TX (US)

(72) Inventors: Vincent Nguyen, Houston, TX (US); Robert E. Van Cleve, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 115 days.

(21) Appl. No.: 15/644,121

(22) Filed: Jul. 7, 2017

(65) Prior Publication Data
US 2019/0011963 A1    Jan. 10, 2019

(51) Int. Cl.
| | |
|---|---|
| G06F 1/00 | (2006.01) |
| G06F 1/20 | (2006.01) |
| G06F 1/324 | (2019.01) |
| G06F 1/3234 | (2019.01) |
| G06F 1/3287 | (2019.01) |

(52) U.S. Cl.
CPC .............. *G06F 1/206* (2013.01); *G06F 1/324* (2013.01); *G06F 1/3243* (2013.01); *G06F 1/3287* (2013.01)

(58) Field of Classification Search
CPC ........ G06F 1/206; G06F 1/3287; G06F 1/324; G06F 1/3243
See application file for complete search history.

(56) References Cited

U.S. PATENT DOCUMENTS

| | | | |
|---|---|---|---|
| 6,363,490 B1 * | 3/2002 | Senyk ..................... G06F 1/206 713/300 |
| 8,769,316 B2 | 7/2014 | Ananthakrishnan et al. | |
| 2012/0159201 A1 | 6/2012 | Distefano et al. | |
| 2014/0052965 A1 | 2/2014 | Sarel | |
| 2014/0176581 A1 | 6/2014 | Shrall et al. | |
| 2015/0220129 A1 * | 8/2015 | Miwa ..................... G06F 1/324 713/322 |

(Continued)

FOREIGN PATENT DOCUMENTS

| | | |
|---|---|---|
| KR | 20130112908 A | 10/2013 |
| KR | 10-1523909 B1 | 6/2015 |

OTHER PUBLICATIONS

Turnhardware, "Intel's Sandy Bridge Architecture Exposed," (Research Paper), Dec. 28, 2016, 31 pages, http://www.turnhardware.net/?p=5646.

*Primary Examiner* — Xuxing Chen
(74) *Attorney, Agent, or Firm* — Hewlett Packard Enterprise Patent Department

(57) ABSTRACT

In one example in accordance with the present disclosure, a method may comprise collecting environment information for a processor, determining a maximum power level for the processor and setting a frequency level and a core-to-frequency ratio that maintains the maximum power for the processor. The frequency level and the core-to-frequency are respectively controlled by a programmable frequency register and a programmable core register. The method may comprise receiving a die temperature corresponding to the processor, determining that the die temperature exceeds a temperature corresponding to the processor and adjusting the maximum power to a level that maintains the temperature.

20 Claims, 4 Drawing Sheets

(56) References Cited

U.S. PATENT DOCUMENTS

| | | | |
|---|---|---|---|
| 2016/0147280 A1* | 5/2016 | Thomas | G06F 1/206 |
| | | | 713/320 |
| 2016/0266629 A1 | 9/2016 | Merrikh et al. | |
| 2017/0031417 A1 | 2/2017 | Allen-Ware et al. | |
| 2017/0063088 A1 | 3/2017 | Wang et al. | |
| 2017/0131754 A1 | 5/2017 | Zobel et al. | |
| 2017/0205863 A1* | 7/2017 | Lee | G06F 1/28 |

\* cited by examiner

PROCESSOR POWER ADJUSTMENT

BACKGROUND

A computer processor may have a number of cores and a base frequency that the cores operate it. Some processors may also have a "turbo" mode that operates one or more of the processor cores at an increased turbo frequency that is beyond the base frequency.

BRIEF DESCRIPTION OF THE DRAWINGS

The following detailed description references the drawings, wherein.

DETAILED DESCRIPTION

Figure 1:
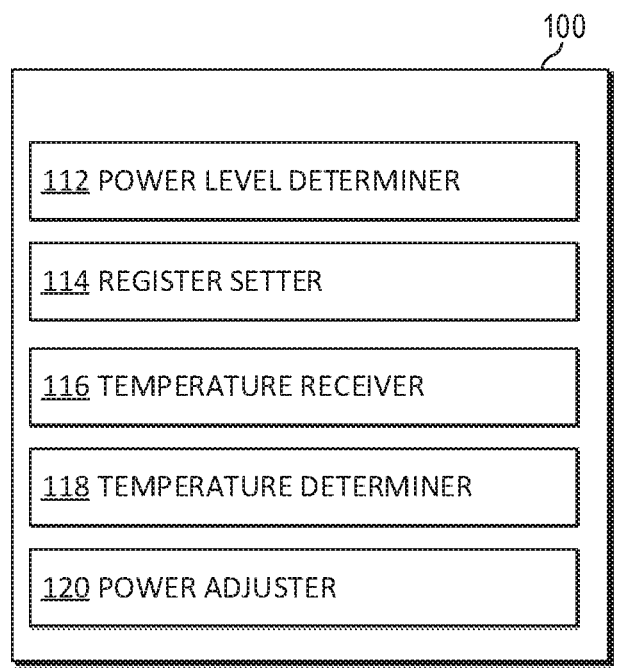
FIG. 1 is a block diagram of an example system for processor power adjustment.

The "turbo" mode may opportunistically uses thermal and power capacity headroom in the system to operate one or more of the processor cores at an increased turbo frequency that is beyond the base frequency. Turbo mode may increases processor performance while maintaining the same Thermal Design Power (TDP) level.

A processor stock keeping unit (SKU) may be specified with a TDP and a maximum power level. To safely maintain these parameters, pre-defined settings are typically be fused and locked in to the processor to ensure the part operates within the standard electrical, thermal and power design specifications. A turbo profile for a processor may be bounded by these constraints via fixed frequency registers and core-to-frequency ratio registers. The core-to-frequency ratio is specified as the ratio of turbo frequency to a numbers of active cores. The power limit for the turbo frequency may be fused to TDP level. The turbo profile scales from each active core to single core active frequency. To maintain same TDP level in the frequency register, the CPU turbo frequencies may be dictated by the number of active cores that were fused in core-to-frequency ratio register. Accordingly, the turbo frequency increases as the number of active cores being utilized by lower workload demands or by core parking/disabling technologies.

As described above these fused frequency registers and core-to-frequency ratio registers cap the processor computing capacity at certain levels. As a general purpose computing processor, however, the turbo profile may be conservatively set to cover worse case thermal condition and various workloads. In other words, the turbo mode may have a one size fits all profile that does not consider the specific configuration and/or environment that the processor may operate in. The systems and methods discussed herein describe a dynamically optimized turbo profile that adapts the processor to the specific use-cases, configurations and/or environments that the operator executes in. Accordingly, the processor may not tuned to fully utilize its operating potential. Introducing In this manner, the systems described herein may alleviate the above listed setbacks and maximize processor computing power by taking advantage of the excess server power and thermal headroom of the specific use case of the processor.

The systems and methods discussed herein may use a processor SKU that has the frequency registers and core-to-frequency ratio registers opened up (i.e. not fused) and programmable. With programmable registers, the systems and methods discussed herein optimize CPU turbo profile for higher processor performance. For example, processor die temperature may be monitored and the CPU turbo profile may be dynamically adjusted by changing the TDP level in the frequency register. Increasing the power level would increase turbo operating frequency and lowering the power level would reduce turbo operating frequency.

A method for processor power adjustment may comprise collecting environment information for a processor, determining a maximum power level for the processor and setting a frequency level and a core-to-frequency ratio that maintains the maximum power for the processor. The frequency level and the core-to-frequency may be respectively controlled by a programmable frequency register and a programmable core register. The method may comprise receiving a die temperature corresponding to the processor, determining that the die temperature exceeds a temperature corresponding to the processor and adjusting the maximum power to a level that maintains the temperature.

FIG. 1 is a block diagram of an example processor power adjustment system 100. In the example shown in FIG. 1, system 100 may comprise various components, including a power level determiner 112, a register setter 114, a temperature receiver 116, a temperature determiner 118, a power adjuster 120, life and/or other components. Any of the various components of processor power adjustment system 100 may also be part of a management chip. For example, the management chip may be a microprocessor, a baseboard management controller (BMC), an out-of-band management controller, etc. In some aspects, the management chip may embedded in a processor die.

According to various implementations, processor power adjustment system 100 may be implemented in hardware and/or a combination of hardware and programming that configures hardware. For example, processor power adjustment system 100 may be implemented in the firmware of the management chip. Furthermore, in FIG. 1 and other figures described herein, different numbers of components or entities than depicted may be used. The hardware of the various components of processor power adjustment system 100, for example, may include one or both of a processor and a machine-readable storage medium, while the instructions are code stored on the machine-readable storage medium and executable by the processor to perform the designated function.

Applying intelligent processor tuning (IPT) may maximize processor performance by creating a custom turbo profile and dynamically tuning to the environmental conditions that the processor is running in. By doing so, IPT may provide the most optimal turbo headroom (higher turbo frequency and/or more active cores) specific use-cases rather than one general "one size fits all" policy for every environment. With IPT, processor performance and specifically turbo mode performance may be optimized and dynamically adapted to changes in the environment, such as workload demands, thermal conditions, etc.

Power level determiner 112 may determine a maximum power level for the processor based on environmental information for the processor. The power level of the processor may be expressed in Watts, though other units of measurement may be used. In some aspects, the maximum power level may be set to the highest possible operating power level capable by the processor.

In some aspects, the processor may be associated with a warranty setting. The warranty setting may define certain information, such as thermal specification and/or specifications for the processor that the processor should not exceed. In these aspects, the maximum power level may be set to the highest possible power level supported by the processor that does not exceed warranty specifications for the processor. For example, power level determiner may determine whether the maximum power level and frequency level exceed a thermal specification defined in the warranty specification and adjust at least one of the maximum power level or the frequency level to meet the thermal specification, when it is determined that the maximum power level and frequency level exceed the thermal specification As described above, processor power adjustment system 100 may be generally used to dynamically tune processor for server performance. Accordingly, the processor power adjustment system 100 may tune the processor for the specific environment that the processor may be used. The specific environment may include the hardware configuration of the system houses the processor and/or that the processor is being used in, the cooling capacity of the system, the temperature of the computer system, the capabilities and heating characteristics of the processor being used, the type of work loads being performed by the processor, etc. The hardware configuration may include a number of cores, number of processors, memory, storage, additional peripherals, power usage, etc.

The environmental information may also include workload information. Processor workloads are often varied and different power consumption profiles, including turbo profiles, may be applicable to the varied workloads. Thus, tuning the turbo profile based on the active workload executed by the processor and/or system and system cooling capacity may yield a higher possible operating turbo frequency for the specific workload actually being performed. For example, non-AVX (Advanced Vector Extensions) instructions may consume much less power than vector instructions. Accordingly, non-AVX workload may have more turbo headroom than AVX instructions. IPT may take these different workload characteristics into consideration and adjust the processor turbo profile accordingly.

In an aspect where the processor executes a plurality of workloads, each workload in the plurality may have a power consumption profile. Power level determiner 112 may determine that the processor is executing a workload with a low power consumption profile and increase the maximum power level for the processor. Similarly, power level determiner 112 may determine that the processor is executing a workload with a higher power consumption profile and decrease the maximum power level for the processor.

As another example, in aspects where the system includes advanced power and thermal features (such as high performance voltage regulation, fans and heatsink, auxiliary cooling, etc.) by programming a higher maximum power.

A processor may have a variety of registers used to control operational parameters of the processor. Importantly, these registers may be programmable rather than hard fused to specific predefined values. For example, a processor may have frequency register corresponding to the power limit if the processor. Thus, as the power limit increases, the frequency that one or more cores of the processor operate at increases.

A processor may also have a core-to-frequency ratio registers. The core-to-frequency ratio is specified as the ratio of turbo frequency to a numbers of active cores. Accordingly, a turbo profile for a processor may be include settings for the frequency registers and core-to-frequency ratio registers. The intelligent processor tuning utilizes these programmable registers to dynamically set values for these registers based on the maximum power for the processor. As will be described in further detail below, this maximum power setting is dynamically adjusted based on the environment that the processor is executing in. However, before dynamically adjusting the maximum power and/or registers, a default may be established. The maximum power may be used as the default setting that is dynamically adjusted.

Register setter 114 may set a first programmable register corresponding to a frequency that maintains the maximum power for the processor. The register setter 114 may also set the core-to-frequency ratio register. In one example, register setter 114 may opportunistically default to the frequency for each core of the processor to be set to the maximum one-core active turbo frequency. For example, setting the frequency level and number of cores that maintains the maximum power for the processor may comprise determining a highest operating frequency level capable by the processor operating at the highest operating power level, setting the highest operating frequency level as the frequency level and setting a total number of cores of the processor as the number of cores.

Temperature receiver 116 may receive a die temperature corresponding to the processor. Temperature determiner 118 may determine whether the die temperature exceeds a temperature corresponding to the processor. The temperature corresponding to the processor may be an upper threshold of a temperature buffer range for IPT to effectively react to any changing loads. In other words, the temperature buffer is used as a throttling threshold to prevent throttling of the processor. Throttling is a process by which the frequency of the processor may be regulated. Throttling is typically performed suddenly, in order to quickly return to safe power limits, and may cause a sudden decrease in performance in the operation of cores of the processor and/or some of the cores may suddenly no longer be in use. By using a temperature buffer with a throttling threshold, the frequency that the processor operates at and/or the number of cores operating may be adjusted (and decreased if possible) without throttling the processor.

As described above, the processor may be dynamically tuned. The processor die temperature may be constantly monitored and the processor turbo profile may be dynamically tuned by adjusting the maximum power level and frequency register. Power adjuster 120 may adjust the maximum power to a level that maintains the temperature, when it is determined that the die temperature exceeds the temperature. Power adjuster 120 may maintain the maximum power when it is determined that the die temperature exceeds the temperature. More details concerning the temperature monitoring and power adjustment are discussed below in reference to FIG. 2.

Figure 2:
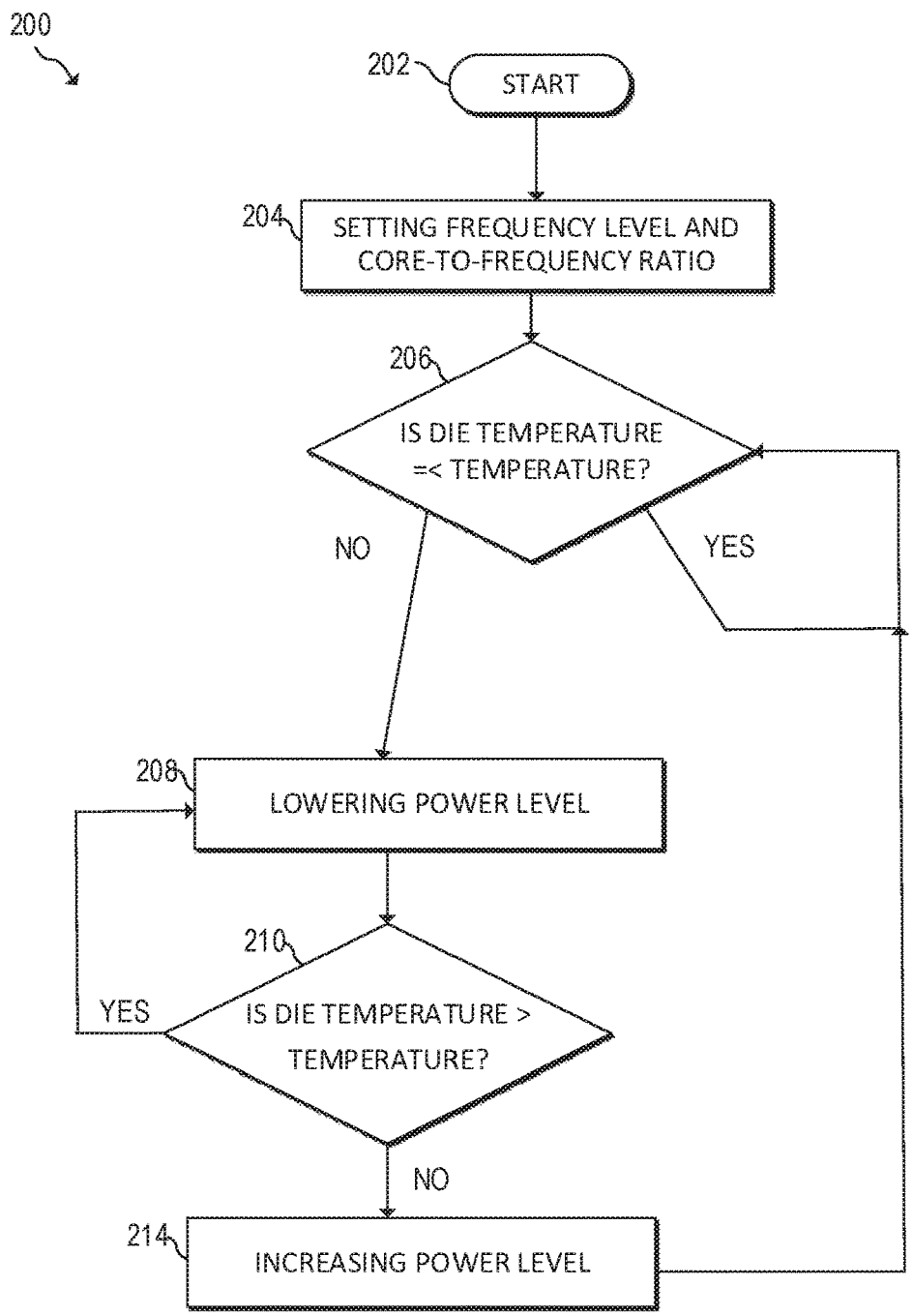
FIG. 2 is a flowchart of an example method for processor die temperature monitoring.

FIG. 2 is a flowchart of an example method 200 for processor die temperature monitoring. The flowchart represent processes that may be utilized in conjunction with various systems and devices as discussed with reference to the preceding figures, such as, for example, system 100 described in reference to FIG. 1 and/or system 400 described in reference to FIG. 4. While illustrated in a particular order, the flowchart is not intended to be so limited. Rather, it is expressly contemplated that various processes may occur in different orders and/or simultaneously with other processes than those illustrated. As such, the sequence of operations described in connection with FIG. 2 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. Although, certain blocks are described as being performed by certain actors (boot environment, admin node, etc.) this is for illustration purposes and in some aspects these blocks may alternatively or additionally be performed by other actors.

Method 200 may start at block 202 and continue to block 204, where the method may include setting a frequency level and a core-to-frequency ratio. As described above, an initial default frequency level and core-to-frequency ration may be determined, based on the default maximum power (such as the default power determined by power level determiner 112 of system 100). The default maximum power may be based on the environmental information, such as the hardware configuration of the system that the processor is being used in, the cooling capacity of the system/processor, the capabilities and heating characteristics of the server/processor being used, the type of work loads being performed by the processor, etc. Once the initial settings have been determined and implemented, method 200 may be used to maintain and/or adjust the initial settings as needed.

At block 206, the method may include determining whether the processor die temperature is less than or equal to a predetermined temperature. The predetermined temperature may be an upper threshold of a temperature buffer range for IPT to effectively react to any changing loads. The temperature buffer provides a time period to react to changing load for the processor. In other words, the temperature buffer is used as a throttling threshold to prevent throttling of the processor.

If it is determined that the processor die temperature is less than or equal to the predetermined temperature (i.e., that the die temperature is below a lower threshold of the temperature buffer range) (YES branch of block 206), then the method may return to block 206 and continue monitoring the processor die temperature. In other words, the method may include determining that. The monitoring may continue, for example, until the system is shut down.

If it is determined that the processor die temperature is not less than or equal to the predetermined temperature (i.e., that the die temperature is above a lower threshold of the temperature buffer range) (NO branch of block 206) then the method may proceed to block 208, where the method may include lowering the maximum power level. Lowering the maximum power level may include setting the programmable frequency level register and a programmable core-to-frequency ratio register in order to maintain the new maximum power level. The maximum power level may be lowered in predetermined increments.

At block 210, the method may include determining whether the processor die temperature is greater than the predetermined temperature. In other words block 210 may include determining whether the processor die temperature exceeds the upper threshold of the temperature buffer range. If it is determined that the processor die temperature is greater than the predetermined temperature (i.e., that the upper threshold of the temperature buffer range is exceeded) (YES branch of block 208), then the processor may return to block 208, where the method may include lowering the power level. The determination of block 210 may also take the effect of hysteresis into effect. In other words, the determination of block 210 may account for the fact that the processor may be in a cooling down period using, for example, an offset value.

If it is determined that the processor die temperature is not greater than the predetermined temperature (i.e., that the upper threshold of the temperature buffer range is not exceeded) (NO branch of block 208), then the processor may proceed to block 214, where the method may include increasing the maximum power level. Increasing the maximum power level may also include setting the programmable frequency level register and a programmable core-to-frequency ratio register in order to maintain the new maximum power level. The maximum power level may be raised in predetermined increments. The increments that the maximum power level is raised may be the same or different to the increments in which the maximum power level is lowered.

Furthermore, the maximum power level may be raised by the predetermined increments all at once and/or incrementally. For example, if the predetermined increment is 10 Watts, then the maximum power level may immediately be raised by 10 watts or may be reduced 1 Watt at a time. If the maximum power level is raised incrementally, after each reduction the die temperature may be checked after each incremental raise. Of course these numbers are for illustrative purposes and other predetermined increments may be used.

After block 214, the method may return to block 206 and continue monitoring the processor die temperature. The monitoring may continue, for example, until the system is shut down.

Figure 3:
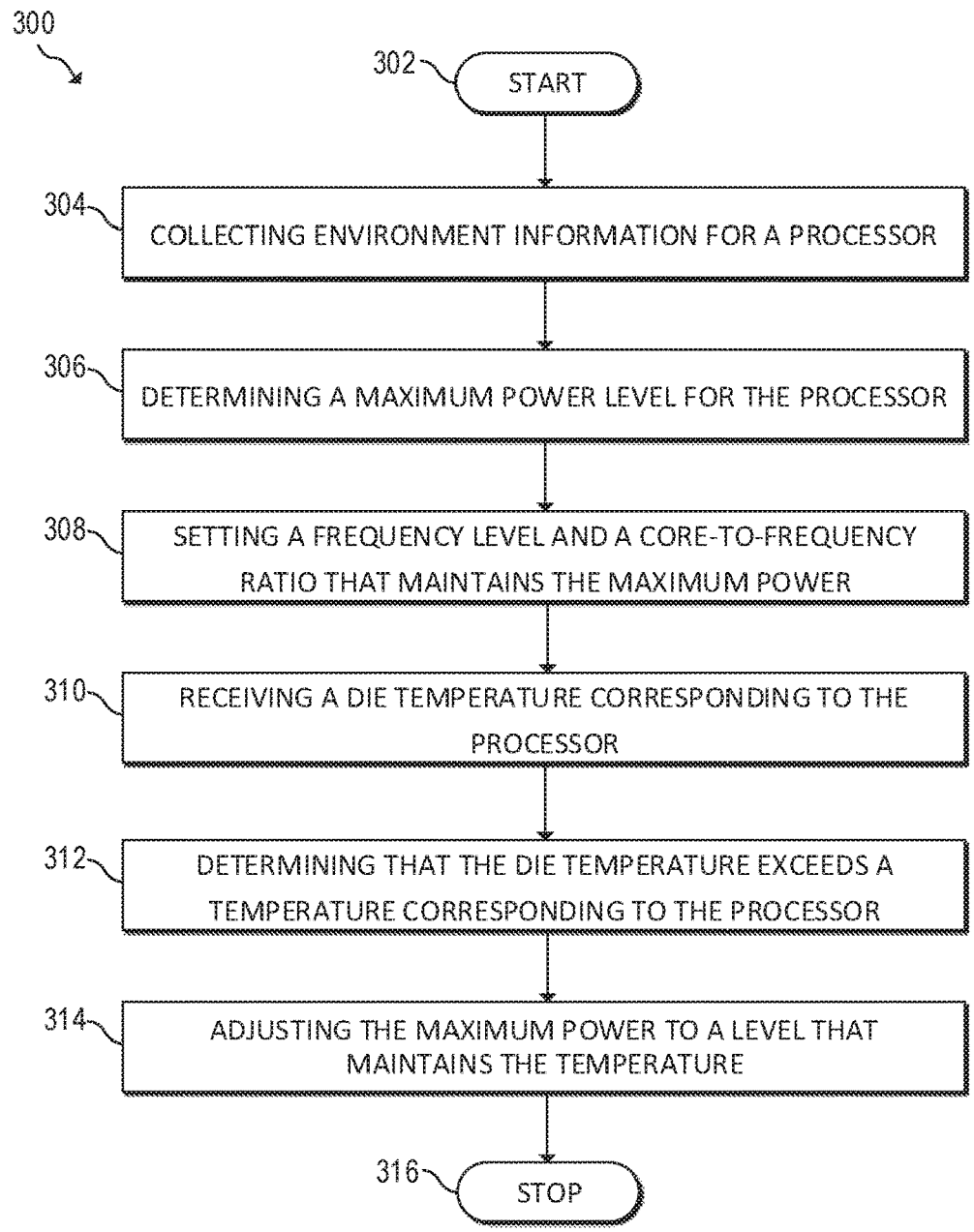
FIG. 3 is a flowchart of another example method for processor power adjustment.

FIG. 3 is a flowchart of an example method 300 for processor power adjustment. The flowchart represent processes that may be utilized in conjunction with various systems and devices as discussed with reference to the preceding figures, such as, for example, system 100 described in reference to FIG. 1 and/or system 400 described in reference to FIG. 4. While illustrated in a particular order, the flowchart is not intended to be so limited. Rather, it is expressly contemplated that various processes may occur in different orders and/or simultaneously with other processes than those illustrated. As such, the sequence of operations described in connection with FIG. 3 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. Although, certain blocks are described as being performed by certain actors (boot environment, admin node, etc.) this is for illustration purposes and in some aspects these blocks may alternatively or additionally be performed by other actors.

Method 300 may start at block 302 and continue to block 304, where the method may include collecting environment information for a processor. The environment information may include a system configuration of a computer system housing the processor and a temperature of the computer system. In some aspects, the environment information may also include a plurality of workloads executable by the processor and each workload in the plurality may have a corresponding power consumption profile. In these aspects, the method may also include determining that the processor is executing a workload with a low power consumption profile and increasing the maximum power level for the processor.

At block 306, the method may include determining a maximum power level for the processor. The maximum power level may be a highest operating power level capable by the processor. At block 308, the method may include setting a frequency level and a core-to-frequency ratio that maintains the maximum power for the processor. The frequency level and the number of cores may be set by a management chip connected to the processor. In some aspects, the management chip may embedded in a processor die. Setting the frequency level and number of cores that maintains the maximum power for the processor may include determining a highest operating frequency level capable by the processor operating at the highest operating power level, setting the highest operating frequency level as the frequency level and setting a total number of cores of the processor as the number of cores.

The frequency level and the core-to-frequency may be respectively controlled by a programmable frequency register and a programmable core register. There may be no values fused into the programmable frequency register and the programmable core register.

At block 310, the method may include receiving a die temperature corresponding to the processor and at block 312, the method may include determining that the die temperature exceeds a temperature corresponding to the processor. The temperature may be an upper threshold of a temperature buffer range that provides a time period to react to changing load for the processor. In some aspects, the method may comprise determining that the die temperature is below a lower threshold of the temperature buffer range and increasing the maximum power level.

At block 314, the method may include adjusting the maximum power to a level that maintains the temperature. The method may proceed to block 316, where the method may end.

Figure 4:
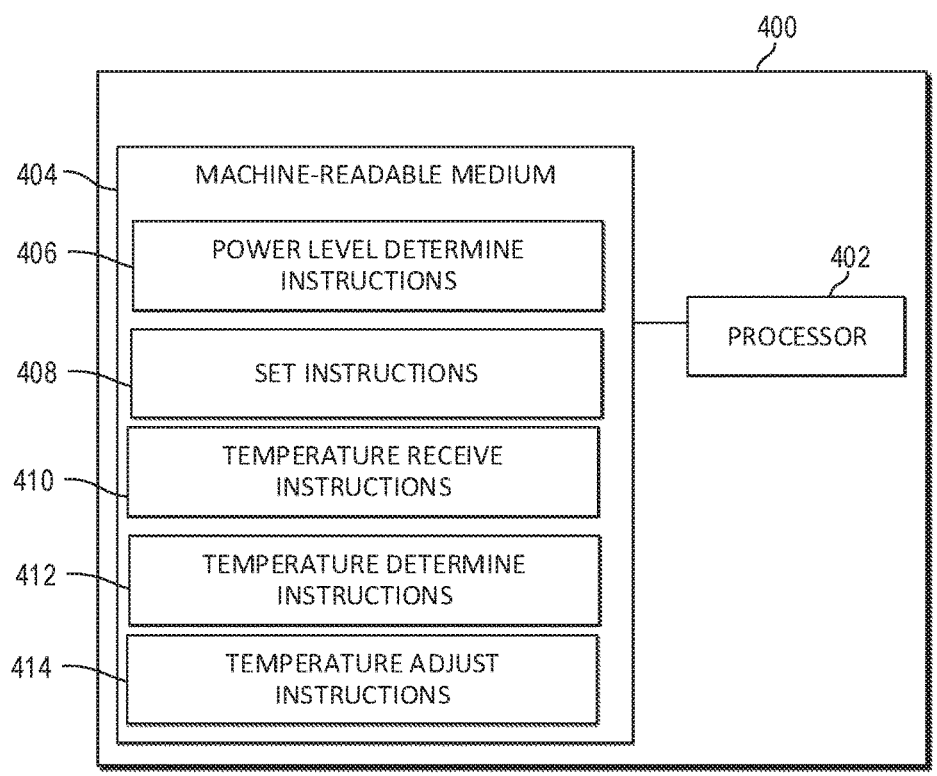
FIG. 4 is a flowchart of an example method for processor power adjustment.

FIG. 4 is a block diagram of an example system 400 for processor power adjustment. In the example illustrated in FIG. 4, system 400 includes a processing core 402. Although the following descriptions refer to a single processing core, the descriptions may also apply to a system with multiple processing cores. In such examples, the instructions may be distributed (e.g., executed by) across multiple processing cores.

Processor 402 may be at least one central processing unit (CPU), microprocessor, and/or other hardware devices suitable for retrieval and execution of instructions. In the example illustrated in FIG. 4, processor 402 may fetch, decode, and execute instructions 406, 408, 410, 412 and 414 to perform replacement functionality of a processing core. In some examples, instructions 406, 408, 410, 412 and 414 may be stored on a machine-readable medium 404. The machine-readable medium 404 may include any volatile memory, non-volatile memory, or any suitable combination of volatile and non-volatile memory. Machine-readable medium 404 may comprise, for example, may be, for example, Random Access Memory (RAM), an Electrically-Erasable Programmable Read-Only Memory (EEPROM), a storage drive, an optical disc, and/or other suitable memory. Processor 402 may include at least one electronic circuit comprising a number of electronic components for performing the functionality of at least one of the instructions. With respect to the executable instruction representations (e.g., boxes) described and shown herein, it should be understood that part or all of the executable instructions and/or electronic circuits included within one box may be included in a different box shown in the figures or in a different box not shown.

Referring to FIG. 4, power level determine instructions 406, when executed by a processor (e.g., 402), may cause system 400 to determine a maximum power level for the processor based on environmental information for the processor. The maximum power level is a highest operating power level capable by the processor. The environment information may include a system configuration of a computer system housing the processor, a temperature of the computer system and/or a plurality of workloads executable by the processor, each workload in the plurality having a power consumption profile.

Set instructions 408, when executed by a processor (e.g., 402), may cause system 400 to set a frequency level and/or a core-to-frequency ratio that maintains the maximum power for the processor. The frequency level may be controlled by a programmable frequency register and the core-to-frequency ratio may be controlled by a programmable core register. There may be no values fused into the programmable frequency register and the programmable core register.

Setting the frequency level and number of cores that maintains the maximum power for the processor may comprise determining a highest operating frequency level capable by the processor operating at the highest operating power level, setting the highest operating frequency level as the frequency level and setting a total number of cores of the processor as the number of cores.

The frequency level and the number of cores may set, for example, by a management chip connected to the processor. In some aspects, the management chip may embedded in a processor die.

Temperature receive instructions 410, when executed by a processor (e.g., 402), may cause system 400 to receive a die temperature corresponding to the processor. Temperature determine instructions 412, when executed by a processor (e.g., 402), may cause system 400 to determine that the die temperature exceeds a temperature corresponding to the processor. The temperature may be an upper threshold of a temperature buffer range that provides a time period to react to changing load for the processor. In some aspects, temperature determine instructions 412 may also cause system 400 to determine that the die temperature is below a lower threshold of the temperature buffer range and increase the maximum power level.

Temperature adjust instructions 414, when executed by a processor (e.g., 402), may cause system 400 to adjust the maximum power to a level that maintains the temperature.

The foregoing disclosure describes a number of examples of processor power adjustment. The disclosed examples may include systems, devices, computer-readable storage media, and methods for processor power adjustment. For purposes of explanation, certain examples are described with reference to the components illustrated in FIGS. 1-4. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples.

What is claimed is:

1. A method comprising:
collecting environment information for a processor;
determining a maximum power level for the processor;
setting a frequency level and a core-to-frequency ratio that maintains the maximum power for the processor, wherein the frequency level and the core-to-frequency are respectively controlled by a programmable frequency register and a programmable core register and the core-to-frequency ratio is a ratio of turbo frequency to a number of active cores;
receiving a die temperature corresponding to the processor;
determining that the die temperature exceeds a temperature corresponding to the processor; and
adjusting the maximum power to a level that maintains the temperature including setting a programmable core-to-frequency ratio register in order to maintain the new maximum power level.

2. The method of claim 1, wherein the temperature is an upper threshold of a temperature buffer range that provides a time period to react to changing load for the processor.

3. The method of claim 2, comprising:
determining that the die temperature is below a lower threshold of the temperature buffer range; and
increasing the maximum power level.

4. The method of claim 1 wherein there are no values fused into the programmable frequency register and the programmable core register.

5. The method of claim 1 wherein the frequency level and the number of cores are set by a management chip connected to the processor.

6. The method of claim 1, wherein the processor is associated with a warranty setting, the method comprising:
determining whether the maximum power level and frequency level exceed a thermal specification defined in the warranty specification
adjusting at least one of the maximum power level or the frequency level to meet the thermal specification, when it is determined that the maximum power level and frequency level exceed the thermal specification.

7. The method of claim 1, wherein the maximum power level is a highest operating power level capable by the processor.

8. The method of claim 7, wherein setting the frequency level and number of cores that maintains the maximum power for the processor comprises:
determining a highest operating frequency level capable by the processor operating at the highest operating power level;
setting the highest operating frequency level as the frequency level; and
setting a total number of cores of the processor as the number of cores.

9. The method of claim 1, wherein the environment information includes a system configuration of a computer system housing the processor and a temperature of the computer system.

10. The method of claim 1, wherein the environment information includes a plurality of workloads executable by the processor, each workload in the plurality having a power consumption profile, the method comprising:
determining that the processor is executing a workload with a low power consumption profile; and
increasing the maximum power level for the processor.

11. A system comprising:
a power level determiner to determine a maximum power level for the processor based on environmental information for the processor;
a register setter to set a first programmable register corresponding to a frequency level and a core-to-frequency ratio that maintains the maximum power for the processor, wherein the core-to-frequency ratio is a ratio of turbo frequency to a number of active cores;
a temperature receiver to receive a die temperature corresponding to the processor;
a temperature determiner to determine whether the die temperature exceeds a temperature corresponding to the processor; and
a power adjuster to adjust the maximum power to a level that maintains the temperature when it is determined that the die temperature exceeds the temperature, including setting a programmable core-to-frequency ratio register in order to maintain the new maximum power level.

12. The system of claim 11 comprising:
the power adjust to maintain the maximum power when it is determined that the die temperature does not exceed the temperature.

13. The system of claim 11 comprising:
the register setter to:
determine a highest operating frequency level capable by the processor operating at the highest operating power level;
set the highest operating frequency level as the frequency level; and
set a total number of cores of the processor as the number of cores.

14. The system of claim 11, wherein the temperature is a above an upper threshold of a temperature buffer range that provides a time period to react to changing load for the processor.

15. The system of claim 13, comprising:
the temperature determiner to:
determine that the die temperature is below a lower threshold of the temperature buffer range; and
increase the maximum power level.

16. A non-transitory machine-readable storage medium encoded with instructions, the instructions executable by a processor of a system to cause the system to:
determine a maximum power level for the processor based on environmental information for the processor;
set a frequency level and a core-to-frequency ratio that maintains the maximum power for the processor, wherein the frequency level is controlled by a programmable frequency register and the core-to-frequency ratio is a ratio of turbo frequency to a number of active cores;
receive a die temperature corresponding to the processor;
determine that the die temperature exceeds a temperature corresponding to the processor; and
adjust the maximum power to a level that maintains the temperature including setting a programmable core-to-frequency ratio register in order to maintain the new maximum power level.

17. The non-transitory machine-readable storage medium of claim 16 wherein there are no values fused into the programmable frequency register.

18. The non-transitory machine-readable storage medium of claim 16 wherein the frequency level and the number of cores are set by a management chip embedded in a processor die.

19. The non-transitory machine-readable storage medium of claim 16, wherein the environment information includes at least one of a hardware configuration of a computer system housing the processor and a temperature of the computer system.

20. The non-transitory machine-readable storage medium of claim 16, wherein the instructions executable by the processor cause the system to determine that the processor is executing a workload with a low power consumption profile, wherein the environment information includes a plurality of workloads executable by the processor, each workload in the plurality having a power consumption profile; and increase the maximum power level for the processor.

* * * * *